United States Patent [19]

Nasr

[11] 3,937,490

[45] Feb. 10, 1976

[54] WHEELCHAIR

[76] Inventor: Ibrahim Abdelrahim Mohamed Nasr, 12, Evelyn Gardens, London, England, S.W.7

[22] Filed: June 25, 1974

[21] Appl. No.: 482,829

[30] Foreign Application Priority Data

June 27, 1973 United Kingdom............... 30460/73

[52] U.S. Cl..... 280/242 WC; 297/DIG. 4; 297/345; 297/45; 297/353

[51] Int. Cl.$^2$ ........................................ B62M 1/14

[58] Field of Search.................. 280/242 WC, 36 B; 297/DIG. 4, 345, 42, 45, 383, 437, 441, 440; 160/354, 368; 135/5 R, 45 A

[56] References Cited

UNITED STATES PATENTS

| | | | |
|---|---|---|---|
| 448,106 | 3/1891 | Argerbright | 160/354 |
| 2,634,790 | 4/1953 | Elle | 135/45 A |
| 2,797,738 | 7/1957 | Patterson | 297/345 |
| 3,076,678 | 2/1963 | Griffin | 297/45 |
| 3,122,395 | 2/1964 | Offner | 297/45 |
| 3,301,595 | 1/1967 | Jennings | 297/437 |
| 3,379,450 | 4/1968 | Jones et al. | 280/36 B |
| 3,442,275 | 5/1969 | Ternes | 135/5 R |

*Primary Examiner*—Leo Friaglia
*Assistant Examiner*—Jack D. Rubenstein
*Attorney, Agent, or Firm*—Fleit & Jacobson

[57] ABSTRACT

A wheelchair having adjustability to suit several body sizes and deformities in that the width of the seat and back rest panels may be adjusted, the height of the seat and arm rests may be adjusted independently of one another, and the length of the seat may be adjusted.

14 Claims, 5 Drawing Figures

WHEELCHAIR

The present invention relates to a wheelchair and in particular to an invalid wheelchair which can readily be adapted to accomodate different sizes and shapes of occupant.

According to the present invention there is provided a wheelchair including a chassis comprising a pair of side frames and an adjustable interconnecting frame structure extending between said side frames; a set of ground wheels mounted on said chassis; a flexible seat panel extending between and attached to said side frames; a flexible back rest panel also extending between and attached to the side frames; and means for adjusting the length of the seat and back rest panels between their points of attachment to the side frames for varying the width of the seat of the chair to suit different widths of intended occupant.

Such a chair enables adjustability of the width of the seat and in this way the chair can be adapted for use by several different occupants.

Preferably additional degrees of adjustment are provided, for example adjustment of any one of the following dimensions: the horizontal distance between the back rest part and the front of the seat base; the height of the arm rests above the seat base; the height of the seat panel above the wheel hubs; and the vertical spacing between the foot rests and the seat panel.

In order that the present invention may more readily be understood the following description is given, merely by way of example, reference being made to the accompanying drawings in which.

Figure 1:
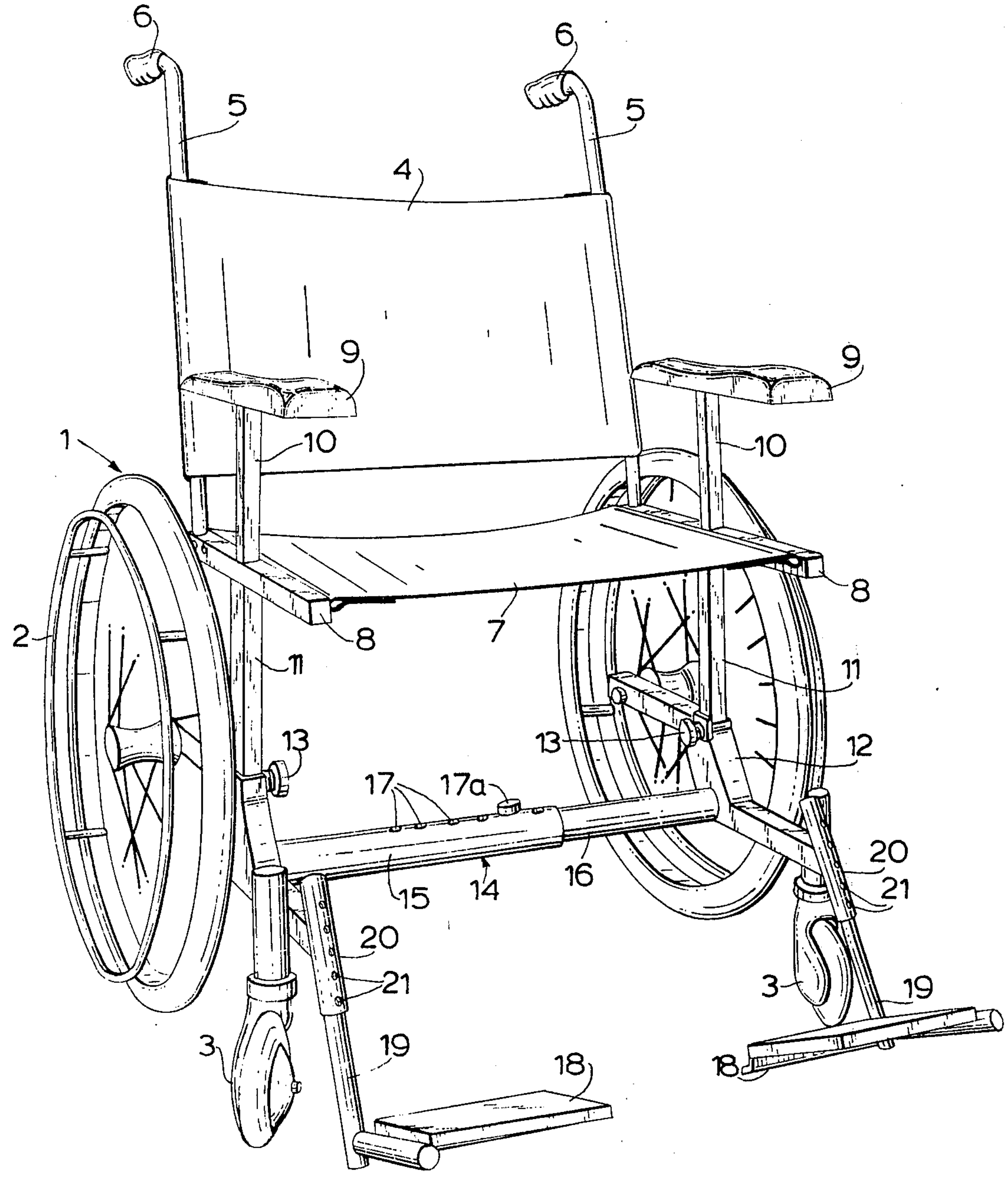
FIG. 1 is a front perspective view of a wheelchair in accordance with the present invention.

The chair shown in FIG. 1 consist of four wheels, the two main ground wheels 1 at the rear each being provided with the customary hand grip 2 for propulsion purposes, and the front pair of wheels 3 being of the normal castoring type. The seat back consists of a fabric backrest panel 4 extending across between two generally upright backrest support posts 5 each having a hand grip 6 at the top. Similarly, the seat base consists of a panel 7 stretched between two horizontal lateral members 8 forming seat support posts.

The arm rests 9 are supported at the top of pillars 10 which are slidably received in the top ends of seat columns 11 and are lockable with respect thereto by means of a screw having a knurled handle, similar to 13, at one end and a locking pin at the other end to engage in an associated aperature in the arm rest support pillar, in order to enable adjustment of the arm rests 9 vertically relative to the seat support members 8. Similarly, the two seat columns 11 themselves are each slidably received in a socket 12a of a respective dog-leg shaped main chassis side frame member 12 and lockable by means of a screw having a knurled handle 13 at one end and a locking pin at the other end to engage in an associated aperture in the seat column.

The front castoring ground wheels 3 are carried at the front end of the main chassis members 12, and the main or rear ground wheels 1 are carried on stub-axles secured to the rear of the main chassis members 12.

The chassis of the chair includes two generally vertical side frames between which extends an interconnecting frame structure in the form of another telescopic tube 14 consisting of an outer tube 15 and a slidable inner tube 16 lockable by means of a locking pin 17*a* which can be positioned in any one of a set of apertures 17 of the outer tube 15 to engage in an aligned aperture in the inner tube 16, preferably threaded so that the locking pin can be screwed into position to retain it.

The two foot rests 18 are carried on support posts 19 each of which is slidable within a respective generally upwardly extending tube 20 having an array of apertures 21 to receive a suitable locking pin in the same manner as the locking arrangement for the length of the transverse telescopic tube assembly 14 of the chassis.

Adjustment of the fore and aft positioning of the seat back panel 4 is also possible since the two upright seat posts 5 are received near the rear of the horizontal seat support members 8 in a range of possible positions so that they can be released and repositioned in any one of the possible positions. In the preferred form of the chair this is allowed for by the provision of vertically extending sockets in the seat support members 8 each socket being capable of receiving the associated seat post 5 in one of the desired positions of adjustment.

The wheelchair in accordance with the present invention thus incorporates five different degrees of adjustability to allow the same chair to be adjusted to accommodate various different sizes and shapes of the human body particularly bearing in mind that wheelchairs are often intended to be used for occupants having severely deformed bodies.

These degrees of adjustment are: (a) the vertical adjustment of the seat relative to the ground; (b) fore and aft adjustment of the seat back relative to the front of the seat base; (c) vertical adjustment of the arm rests relative to the seat base; (d) adjustability of the width of the chair and (e) vertical adjustability of the vertical spacing between the foot rests and the seat base.

Figure 2:
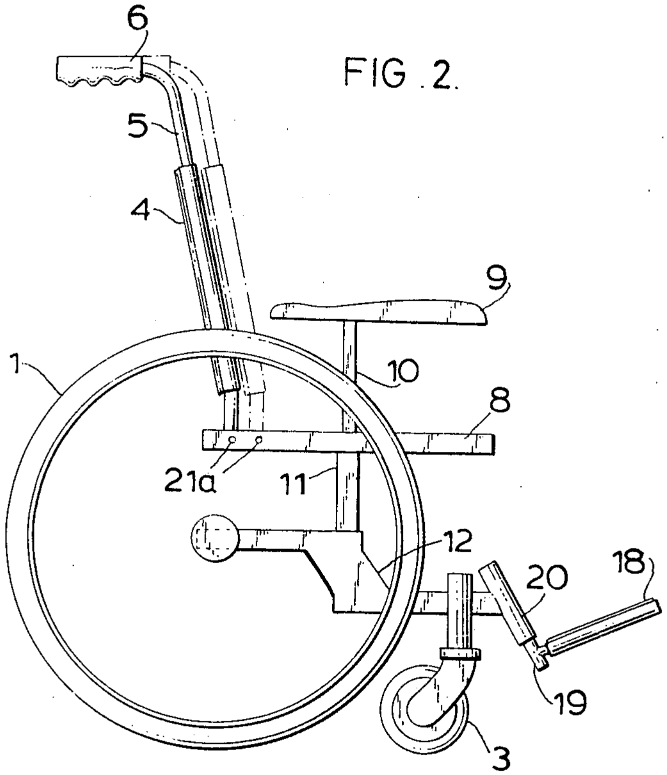
FIG. 2 is a side elevational view of the chair of FIG. 1.

The side elevational view of FIG. 2 shows two apertures 21*a* and which are intended to receive locking screws to hold the seat posts 5 in their appropriate sockets. The vertical adjustability of the arm rests 9 relative to the seat support members 8 can be more clearly seen with reference to FIGS. 2 and 3 rather than with reference to FIG. 1.

Figure 3:
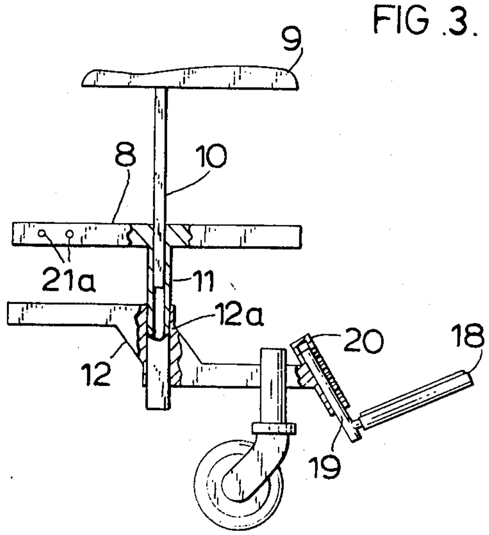
FIG. 3 is a schematic view showing the adjustment features embodied in the chair.

FIG. 3 shows more clearly the telescopic adjustment of the seat columns 11 relative to the main chassis members 12 although the locking wheel 13 is omitted from FIG. 3 in order to preserve clarity of the drawings.

When the width of the chair is changed by adjustment of the length of the telescopic tube arrangement 14, the width of the seat back and base panels 4 and 7, respectively, needs to be adjusted accordingly. In the preferred form of the invention this adjustment is allowed for by the fact that the ends of th panels 4, 7 pass round support members (either the seat posts 5 or a support bar carried by the seat support members 8 but concealed from view in the Figures) and are then attached to the back of the main panel by means of press studs. In alternative arrangement the means of securing the ends to the back of the panel comprise Velcro (R.T.M.) strips.

If desired, more than one cross member may be incorporated on the chassis in which case the prevention of relative rotation between the two parts of the telescopic cross member 14 would not be so critical. In any case, where a single cross member 14 is used it is possible for the cross section of that member to be of a suitable form to prevent relative rotation between its outer and inner tube 15 and 16, respectively. For example, the cross member 14 may consist of a square section tube allowing simple sliding movement of the constituent parts.

Clearly the provision of two foot rests each independently adjustable vertically relative to the wheelchair chassis allows the chair to be used for severe deformities where, for example, the occupant's legs are of different lengths, or possibly also where the legs have different limited degrees of flexure possible.

Figure 4:
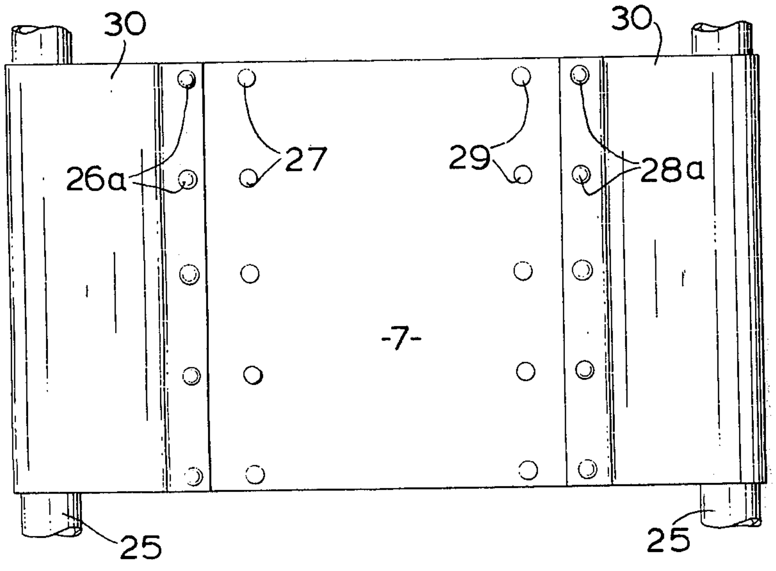
FIG. 4 is an underneath plan view showing the seat panel with its adjustment means.
Figure 5:
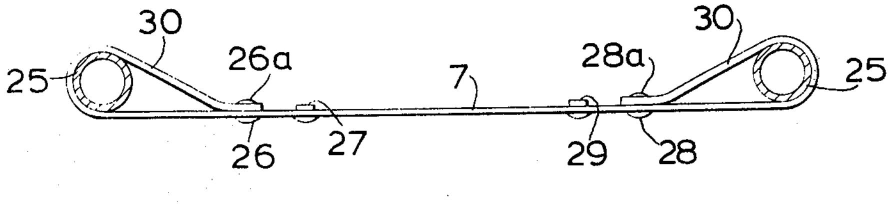
FIG. 5 is a side elevational view showing the seat panel of FIG. 1 but in inverted configuration.

As shown in FIGS. 4 and 5, which illustrate the means of fixing the seat panel 7 to the side frame members 12, the ends of the web 7 of the seat panel are folded around respective tubular seat support posts 25 fastened at their ends to the seat support members 8 and have rows of male press studs **26*a* and 28*a* which engage female press studs 26 and 28 of respective rows of similarly spaced studs. There is at each end of the panel 7 a further row 27 or 29, respectively of female press studs extending parallel to the first mentioned rows 26 and 28** and having a similar spacing between adjacent studs in the rows.

In this way each folded over end 30 of the panel 7 can be adjusted in position merely by disengaging studs 28, **28*a* and 26, 26*a* and instead engaging studs 26a, 28a with further studs 27, 29**, respectively.

The back rest panel 6 is similarly adjustably fastened to its support posts 5 and is of identical construction.

I claim:

1. A wheelchair including a chassis comprising spaced side frame means and adjustable interconnecting frame means extending between said side frame means; ground wheels mounted on said chassis; a flexible seat panel extending between said side frame means; means on said seat panel defining spaced attachment points for attaching said seat panel to both of said side frame means; a flexible back rest panel extending between and attached to the side frame means; means on said back rest panel defining spaced attachment points for attaching said back rest panel to both of said side frame means; and means for adjusting the length of said seat and back rest panels between their points of attachment to the side frames for varying the width of the seat of the chair to suit different widths of intended occupant.

2. A wheelchair as set forth in claim 1, wherein the seat and back rest panels each comprise a web of flexible material and said attachment point defining means each comprise end portions of the material doubled over to form loops wherein said side frame means each include support posts around one of which the respective end of the seat panel may be folded and around the other of which the respective end of the back rest panel may be folded; and wherein means are provided for securing each doubled over material portion of the seat and back rest panels respectively to a different region of the same panel to adjust the length of the panel.

3. A wheelchair as set forth in claim 2, wherein the said securing means comprise a row of press stud means along one end of each web and at least two further rows of co-operating stud means parallel thereto, spaced inwardly from the said one end.

4. A wheelchair as set forth in claim 2, wherein both ends of the seat panel and both ends of the back rest panel have means for adjusting the position of the doubled over portion.

5. A wheelchair as set forth in claim 1, wherein said adjustable interconnecting frame means comprises telescopically interfitting tube means with means for locking the interfitting tube means in any one of several configurations of different length, and means securing each end of the interfitting tube means to a respective side frame means.

6. A wheelchair as set forth in claim 2, wherein the two seat panel support posts extend horizontally and means are provided for mounting each seat panel support post vertically movably on one of said side frames.

7. A wheelchair as set forth in claim 6, and including arm rests carried by said side frames, and means for adjustably positioning said arm rests above said horizontal seat panel support posts, said arm rests being free of direct connection to said back rest support posts.

8. A wheelchair as set forth in claim 7, wherein each arm rest comprises a generally horizontal arm support carried at the top end of an arm rest support pillar, said pillar being slidable vertically relative to a socket of a respective one of the side frames and lockable in a number of alternative positions relative to said socket.

9. A wheelchair as set forth in claim 2, wherein the back rest support posts are mounted generally upright on said side frame means, and means are provided for adjusting said back rest support posts with respect to the side frame means in a direction longitudinally of the seat panel support members.

10. A wheelchair as set forth in claim 1, including foot rest means carried by said side frame means, and means for adjusting the positioning of said foot rest means vertically relative to said chassis.

11. A wheelchair as set forth in claim 10, wherein said foot rest means consists of two foot rests, foot rest support posts each carrying a respective foot rest, support tubes of the side frame means each slidably receiving a respective foot rest support post, and means for locking each support post in any one of a number of positions relative to its associated support tube.

12. A wheelchair including a chassis, ground wheels carried by said chassis, arm rest means carried by said chassis at each side of the chair, a generally horizontal seat panel, seat panel support means extending horizontally along said chassis below each arm rest means for supporting said seat panel, means mounting said seat panel support means on said chassis for adjustable positioning in a vertical direction relative to said chassis, a generally vertical back rest panel, back rest support pillars extending generally upwardly from said seat panel support means, and means mounting said back rest panel support pillars on said seat panel support means of said chassis in one of several positions spaced in a horizontal direction along said seat panel support means said support pillar mounting means comprising a plurality of longitudinally spaced vertical sockets in said seat panel support means for securing said support pillars, and pillar engaging fastening means for securing said pillars therein.

13. A wheelchair as set forth in claim 12, and including means for adjusting the position of said foot rest means in a vertical direction relative to said chassis.

14. A wheelchair including a chassis; arm rest means carried by said chassis; seat panel support means extending horizontally along said chassis below each of said arm rest means; vertical tubular support means under each arm rest means and carrying said seat panel support means; means on each side of said chassis for slidably receiving said vertical tubular support means; means for locking said tubular support means in any one of several vertically spaced positions relative to said receiving means; a generally vertical arm rest support pillar under each arm rest means and carrying said arm rest, said arm rest support pillar being adapted to be slidably received in said tubular support means; means locking said arm rest support pillars in any one of a plurality of vertically spaced positions relative to said tubular support means; and a generally horizontal seat panel carried by said seat panel support means.

* * * * *